July 22, 1947.     I. W. DOYLE ET AL     2,424,439
FOCAL PLANE SHUTTER
Filed May 17, 1945     2 Sheets-Sheet 1
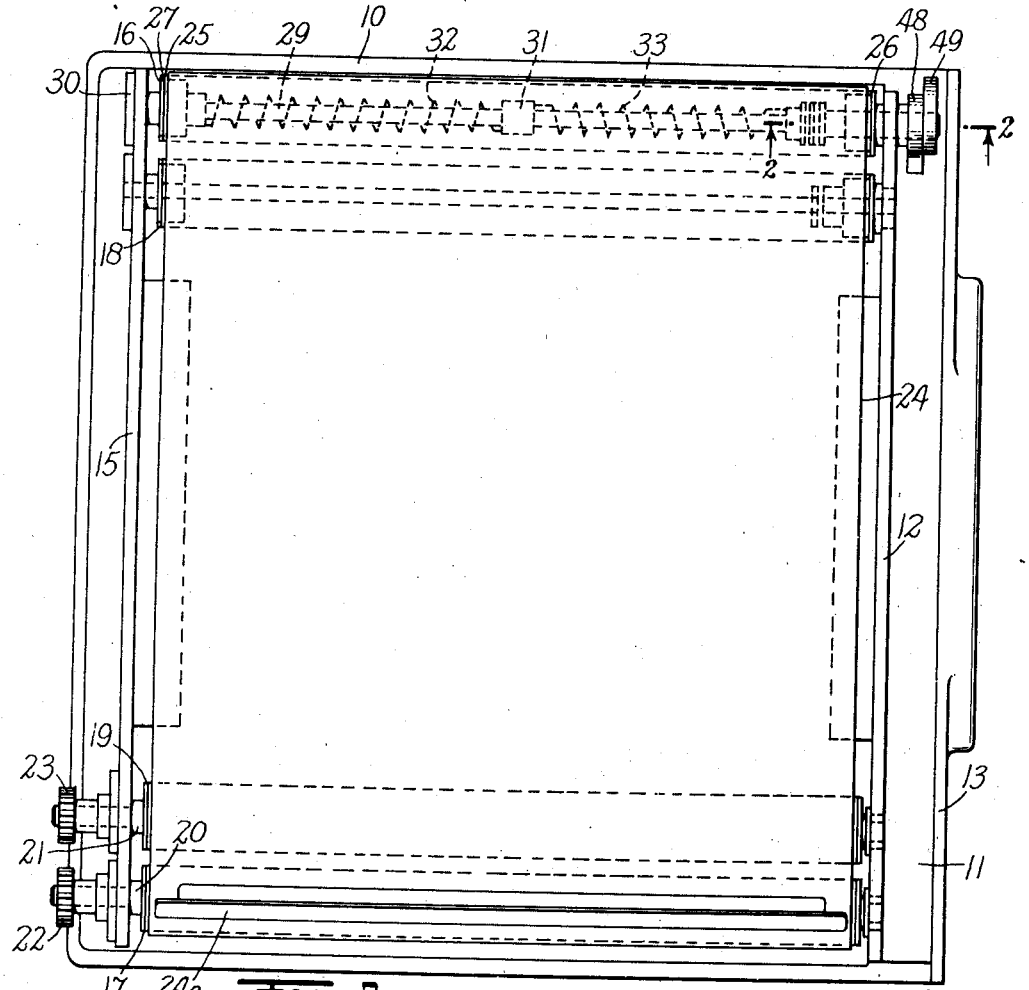
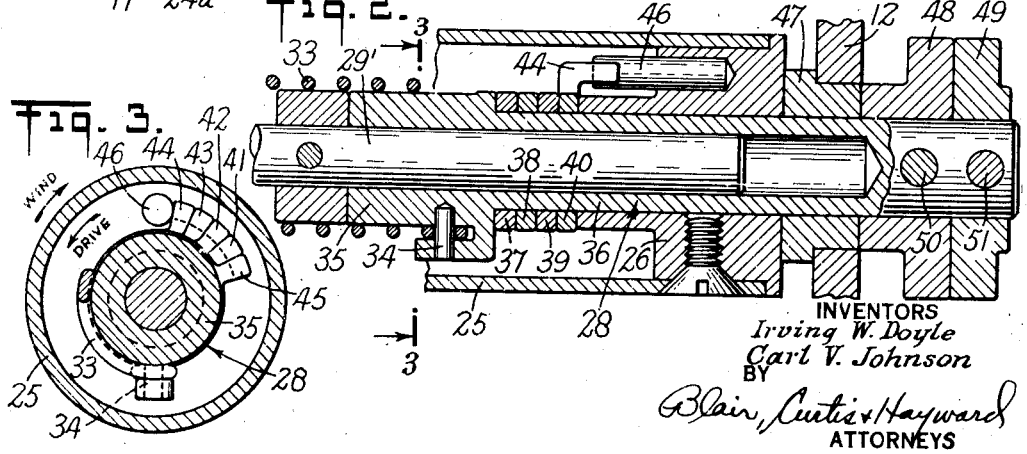
INVENTORS
Irving W. Doyle
Carl V. Johnson
BY
Blair, Curtis & Hayward
ATTORNEYS

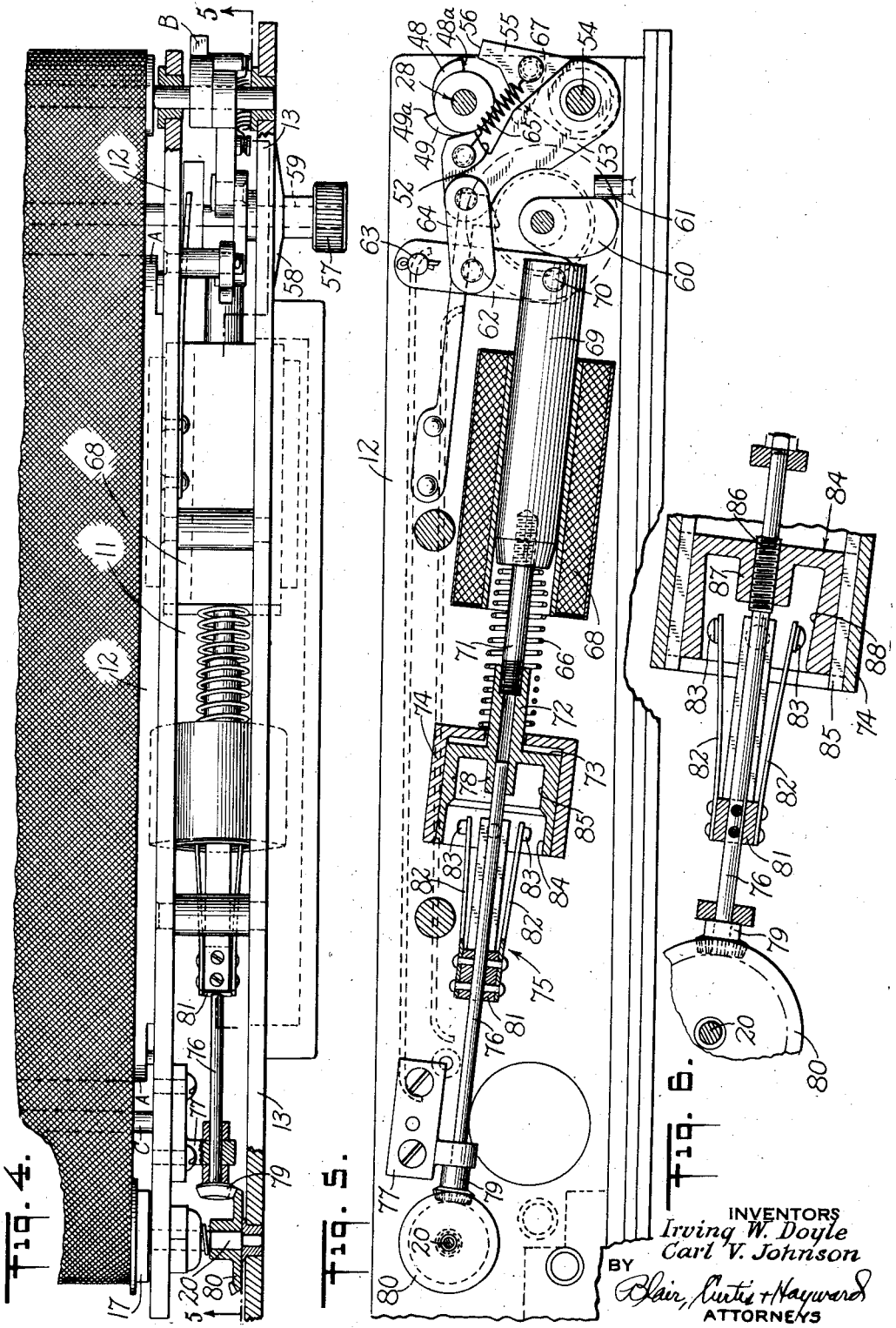

Patented July 22, 1947

2,424,439

UNITED STATES PATENT OFFICE 2,424,439

FOCAL-PLANE SHUTTER

Irving W. Doyle, Massapequa, and Carl V. Johnson, Kew Gardens, N. Y., assignors to Fairchild Camera and Instrument Corporation, Jamaica, N. Y., a corporation of Delaware Application May 17, 1945, Serial No. 594,346

9 Claims. (Cl. 95—57)

This invention relates to a camera shutter, and more particularly to a focal plane shutter for an aerial camera.

For certain types of military and civilian use, it has been found advantageous to employ a relatively small aerial camera equipped with a focal plane shutter. As in most instances, these shutters have been capable of but one speed of operation, they have been lacking in versatility, or rather in applicability, where varying conditions of operation have been encountered. Thus, while a given camera with a fixed shutter speed might be ideal under certain conditions of altitude and light, it would produce unsatisfactory results under widely variant conditions. For example, if the camera were capable of a relatively high shutter speed of the order of 1,000th of a second, it might well be satisfactory for low flying reconnaissance work where the high shutter speed would tend to eliminate ground movement. The same camera, however, might well produce unsatisfactory results at higher altitudes, or where light conditions were poor, or both.

Focal plane shutters of variable speed are, of course, well known, but in most instances are characterized by complex mechanisms by which the shutter speed may be adjusted, and which are not amenable to remote control. Furthermore, such shutters, in certain cases, produce unsatisfactory results by reason of variation in curtain velocity during an exposure.

It is accordingly among the objects of this invention to provide a focal plane shutter which is simple, sturdy and efficient, and which is capable of obviating the difficulties referred to hereinabove in a practical and simple manner.

The invention accordingly consists in the features of construction, combinations of elements, and arrangements of parts, as will be exemplified in the structure to be hereinafter described, and the scope of the application of which will be indicated in the following claims.

In the drawing, in which there is shown one form of our shutter,

Figure 1 is a top plan view of the shutter;

Figure 2 is an enlarged vertical section taken along the line 2—2 of Figure 1;

Figure 3 is a vertical section taken along the line 3—3 of Figure 2;

Figure 4 is a substantially enlarged fragmentary top plan view of portions of the operating and controlling mechanism for the shutter shown in Figure 1;

Figure 5 is an elevation of the mechanism shown in Figure 4 with the side plate removed; and, Figure 6 is an enlarged sectional elevation of a modified form of governor for controlling the velocity of the shutter curtain.

Similar reference characters refer to similar parts throughout the views of the drawing.

As shown in Figure 1, the shutter curtain and its operating mechanism to be described hereinafter are housed in a casing 10, one side of which is compartmented, as at 11, by partition 12 and an outer wall 13, between which is housed the mechanism shown in Figure 4, wall 13 being provided with an enlargement for the reception of a portion of this mechanism. At the opposite side of casing 10 is another wall or partition 15 which, with partition 12, rotatably support shutter curtain rollers 16 and 17 and capping curtain rollers 18 and 19. The shafts 20 and 21 on which rollers 17 and 19, respectively, are mounted, carry at one end thereof driving gears 22 and 23, respectively, by which rollers 17 and 19, respectively, are driven to wind or set the shutter. Inasmuch as the capping curtain and its associated parts form no portion of this invention, it will only be noted that this curtain may be of a conventional type operated in a conventional manner. Reference is made here to our copending application, Serial No. 623,620, filed October 22, 1945, wherein the driving means for the shutter curtain and capping curtain, i. e., the means by which the gears are driven and tripped is shown and described.

A shutter curtain 24, provided with a transverse exposure slit 24a, has one end attached to roller 17, the other end being attached to roller 16, which latter roller is the driving roller which draws the curtain and its slit across the usual aperture in the focal plane. This latter roller 16 comprises a cylindrical shell 25 fastened at its opposite ends respectively to hubs 26 and 27, the former of which, as shown in Figure 2, is rotatably mounted on a sleeve generally indicated at 28, and the latter of which is rotatably mounted on a stationary shaft 29, supported by sleeve 28 (Figure 2) and by a suitable bushing 30 (Figure 1) mounted in wall 15 of the shutter casing.

Fastened substantially centrally of shaft 29 is a collar 31 to which is anchored one end of a shutter driving spring 32, the other end of which is fastened to hub 27, this spring being the main driving spring for curtain 24. It will now appear that when gear 22 is driven in a direction to rewind the shutter, curtain 24 is drawn or unwound from roller 16, and wound on roller 17 during the course of which spring 32 is tensioned. Upon release of gear 22 by the tripping mechanism described in the aforesaid application, spring 32 accordingly sweeps curtain 24 and slit 24a across the shutter aperture to make an exposure.

As noted hereinabove, it is desirable under certain circumstances to vary the shutter speed. One of the conventional manners of attaining this end is to provide mechanism for setting the tension in the shutter spring, such as spring 32, to different values. There are certain disadvantages to attaining different shutter speeds in this manner, one of which lies in a resulting inherent variation in the velocity of the shutter due to acceleration as it moves across the focal plane. To obviate this difficulty in addition to others, we have provided a booster spring 33 through the use of which, as will be described, an increased shutter speed is obtainable. The inner end of spring 33 is anchored to collar 31, the other end thereof being fastened as by a pin 34 (Figure 2) to an enlarged portion 35 at the inner end of sleeve 28. This sleeve includes an elongated reduced portion 36 which not only rotatably supports hub 26, but also rotatably carries a plurality of washers 37, 38, 39 and 40. These washers are respectively provided with tabs 41, 42, 43 and 44, which extend radially and then axially of the washer in the manner of tab 44, as shown in Figure 2. Enlarged portion 35 of sleeve 28 (Figure 3) has a similar tab 45 formed thereon. When these tabs 41—45 are nested together in the relation shown in Figure 3, they form a driving connection between spring 33 and a pin 46 (see also Figure 2) which is carried by the hub 26, whereby the driving effect of booster spring 33 is exerted on curtain roller 16 to supplement the driving force of main spring 32 (Figure 1).

As noted hereinabove, sleeve 28 is rotatably mounted on stationary shaft 29. The outer end of this sleeve is also journaled in a bushing 47 carried by partition 12, and extends through the partition to carry on its outer end a pair of cams 48 and 49, by which the action of booster spring 33 is controlled in the manner to be described. Cams 48 and 49 are fastened to the sleeves by pins 50 and 51, respectively.

When high shutter speed is desired, booster spring 33 drives sleeve 28 through the angular distance between the abutment 49a (Figure 5) on cam 49 and a hook portion 52 on a lever 53 when the lever is in the position shown in Figure 5. This lever is pivotally mounted on a stud 54 supported at its opposite ends by partition 12 and side wall 13 (Figure 1). Stud 54 also pivotally supports another lever 55 having a stop portion 56 adapted to coact with the abutment 48a of cam 48 when the lever 55 is pivoted counterclockwise, as viewed in Figure 5, this latter lever being provided to eliminate the action of booster spring 33 (Figure 2) when low shutter speed is desired.

It may now be seen that when levers 53 and 55 are in the position shown in Figure 5 and the shutter is wound, i. e., in the position shown in Figure 2, both of the springs 32 and 33 (Figure 1) are under tension. When the shutter is tripped, both springs start to draw its slit 24a across the focal plane, spring 32 by reason of its direct connection to the shutter roller, and spring 33 by reason of its more or less indirect connection to the shutter roller through washers 37—40 and their tabs. This driving effect of spring 33 is, of course, exerted on sleeve 28 so that the sleeve also is rotated. Rotation of the sleeve is, however, limited by the engagement of cam stop 49a (Figure 5) and lever hook portion 52, this amount of travel of the sleeve being so proportioned that when the cam and lever hook engage, the curtain slit has not yet reached the focal plane aperture. Thus, the combined initial action of the two springs 32 and 33 is sufficient to accelerate the curtain rapidly to the velocity at which it is desired to sweep the curtain slit across the focal plane aperture, but as the curtain slit sweeps across the aperture, booster spring 33 is no longer exerting its force on the shutter curtain, reliance being placed on the remaining tension in main spring 32, as well as on the attained momentum of the curtain to effect an exposure at the desired speed. Through this combined action of the springs, we have avoided to a considerable extent objectionable acceleration of the curtain slit over the initial portions of the focal plane aperture.

When it is desired to drive the curtain at a lower speed, levers 53 and 55 (Figure 5) are pivoted counterclockwise in a manner to be described, to position stop portion 56 of lever 55 in the path of cam abutment 48a. When these parts are thus relatively positioned, cam 48 and accordingly sleeve 28 (Figure 2) move but a few degrees, hence precluding any but a negligible amount of driving force from being exerted by booster spring 33, roller 25 accordingly being driven at the lower speed by spring 32 (Figure 1) only. Under this condition, pin 46, which is carried by roller hub 26 (Figure 2) is driven counterclockwise, as viewed in Figure 3, away from the washer tabs 41—44, rather than by the tabs through which the force of booster spring 33 (Figure 2) cannot be exerted when sleeve 28 is held as explained.

The desired shutter speed may be selected manually by means of a knurled knob 57 (Figure 4) which, with a speed value indicating disc 58, is fastened to a shaft 59 journaled in side wall 13 and partition 12. Also fastened to this shaft between the wall and partition is a cam 60 (Figure 5) which rests in the position shown against a stop 61 when the shutter is set for high speed operation.

Resting against cam 60 is a lever 62, which is pivotally mounted on a pin 63 fastened between partition 12 and wall 13. Between the ends of lever 62 is pivotally connected one end of a link 64, the other end of which is pivotally connected to lever 53. It will now appear that when cam 60 is rotated clockwise, as viewed in Figure 5, by manipulation of knob 57, lever 62 is rocked clockwise, causing link 64 to be drawn to the left. This movement of the link rocks lever 53 counterclockwise, and by reason of the connection between this lever and lever 55, by means of a spring 65, lever 55 is also rocked counterclockwise so that its stop portion 56 is moved into the path of travel of cam abutment 48a. This position of the lever, as explained above, effects low speed operation of the shutter.

Conversely, when cam 60 is rocked counterclockwise from the low speed position to the high speed position shown, the lever system just described reverses in operation under the bias of a spring 66 (described in detail below) with the result that levers 53 and 55 are pivoted back to the position shown, lever 55 being forced into its indicated position by means of a pin 67 carried by lever 53 and bearing against lever 55.

Under certain circumstances, it is desirable that the camera be remotely located in the airplane, i. e., located in a relatively inaccessible position therein, which necessitates remote control of the camera. We have accordingly provided a solenoid 68 in compartment 11 (Figure 4) between partition 12 and wall enlargement 14, the solenoid being therein supported in any suitable manner. Solenoid 68 includes an armature 69 (Figure 5) one end of which is pivotally connected, as by a pin 70, to lever 62, and the other end of which is connected to one end of a rod 71. The other end of rod 71 is fastened to the shank 72 of a cup 73, which is reciprocably, but not rotatably, mounted in a stationary housing 74 fastened between shutter partition 12 and wall enlargement 14 (Figure 4) in any convenient manner. Spring 66 (Figure 5) is disposed under tension between housing 74 and the left-hand end of solenoid plunger 69 so that the plunger is under a constant bias to the right. Hence, when the solenoid is deenergized, the lever system hereinbefore described, by which the shutter speed is set, is in the condition shown. When, however, solenoid 68 is energized, the lever system is moved into the low shutter speed position also described.

As noted hereinbefore, it is extremely important that the velocity of the shutter curtain slit be maintained at a substantially constant value as it moves across the focal plane aperture. This condition is to a certain extent approached at high shutter speed through the combined action of springs 32 and 33 (Figure 1) as hereinbefore described. However, in order to prevent deceleration of the curtain slit, it is necessary to provide substantial tension in main spring 32 which might result in continued acceleration at high shutter speed, and probably would result in acceleration at low shutter speed. To preclude this undesirable condition, we have provided a governor generally indicated at 75 (Figure 5).

Governor 75 includes a shaft 76 journaled at one end in a bracket 77 fastened to the side of partition 12, and at the other end in a boss 78 formed inside of cup 73. The first-mentioned end of shaft 76 carries a bevel pinion 79 which meshes with a bevel gear 80 carried at one end of shaft 20 (Figure 4) to which curtain roller 17 is attached. Governor shaft 76 also has fastened thereto a collar 81 or the like, which carries a plurality of resilient arms 82 on the free ends of which are fastened flyweights 83. These flyweights are, upon rotation of shaft 76 during shutter exposure operation, adapted to engage one or the other of stepped portions 84 or 85 of the inside of cup 73, depending upon the position of the cup within its housing 74, as determined by the shutter speed selected. With the cup in the position shown in Figure 5, the governor flyweights 83 can, upon rotation of shaft 76, engage cup portion 84, thereby limiting the speed of rotation of shaft 76, and accordingly curtain roller 17 (Figure 4) to the desired value to prevent acceleration of the curtain slit during its high speed shutter operation. When the shutter speed is adjusted either manually or by means of solenoid 68, as described for low speed operation, cup 73 is moved to the left, as viewed in Figure 5, to a position where the governor flyweights 83 may engage stepped portion 85 of the cup. As this portion is of less diameter than portion 84, it follows that rotation of shaft 76, and accordingly the speed of curtain roller 17, will be limited, and at the same time acceleration of the curtain slit will be precluded. It may now be seen that regardless of the shutter speed selected, the velocity of the curtain slit during its exposure movement is maintained at a substantially constant value.

Under certain circumstances as, for example, in the case of a camera equipped to expose large sizes of film, the focal plane shutter curtain is of necessity of substantial length and may even be made of heavier material to withstand the larger forces resulting from exposure operation. In a case of this sort, and also in the case of smaller shutters, the angular velocity of the curtain roller from which the shutter curtain is unrolled during exposure varies as the overall diameter of the roller and curtain lessens. This, of course, causes a corresponding variation in curtain slit velocity, and may produce unsatisfactory results. To the end of rectifying this condition, we have provided the governing device shown in Figure 6. This device corresponds in general to governor 75 (Figure 5) and accordingly includes driven shaft 76, resilient arms 82 fastened to the shaft, and flyweights 83 which operate within a cup generally indicated at 84 (Figure 6) which differs in a manner to be described from cup 73 (Figure 5). Cup 84 (Figure 6) is, however, mounted for axial movement relative to its housing 74, but is restrained from rotation relative thereto in any suitable manner, as for example, by keys and keyways 85.

Shaft 76 includes an exteriorly threaded portion 86, which is threadably received in an interiorly threaded boss 87, formed in cup 84, so that as shaft 76 and its threaded portion 86 rotate, cup 84 is moved axially of the shaft. Cup 84 is provided with an interior tapered hole 88, which is smaller at the open end of the cup than at the closed end thereof, the angle of the taper being a function of the lessening diameter of the curtain wound on roller 17 (Figure 4) as the curtain is unwound therefrom during exposure operation. As exposure operation of the curtain is initiated, cup 84 (Figure 6) is so positioned relative to flyweights 83 that the flyweights are in a position to engage the smaller end of cup hole 88. The governor shaft 76 continues to rotate as the curtain is unwound from roller 17 (Figure 4), and the threaded connection between shaft 76 (Figure 5) and cup 84, causes the cup to move to the left, as viewed in this figure, permitting flyweights 83 to engage increasingly large diameters of hole 88. At the same time, of course, the curtain is being unwound from the roller, as noted. Thus it may be seen that as the governor flyweights 83 engage increasingly large diameters of hole 88, faster rotation of shaft 76, and accordingly curtain roller 17, is permitted, thus compensating for the decreasing diameter of the curtain unwound on the roller, which would otherwise result in a decrease in the curtain slit velocity.

It will now appear that we have provided a focal plane shutter which attains the several objects set forth hereinabove in a thoroughly practical and efficient manner.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

What we claim is:

1. In focal plane shutter construction, in combination, a casing, spaced curtain rolls rotatably mounted in said casing, a curtain having its ends fastened respectively to said rolls, driving means associated with one of said rolls for drawing said curtain from the other of said rolls, and additional driving means coaxial with said first-mentioned driving means and selectively connectable with said one roll for moving said curtain at a higher velocity.

2. In focal plane shutter construction, in combination, a casing, spaced curtain rolls rotatably mounted in said casing, a curtain having its ends fastened respectively to said rolls, driving means associated with one of said rolls for drawing said curtain from the other of said rolls, additional driving means selectively connectable with said one roll for moving said curtain at a higher velocity, and means for maintaining the velocity of said curtain at a substantially constant value during exposure movement thereof.

3. Apparatus in accordance with claim 1 wherein each of the driving means comprises a spring disposed within said one roll.

4. In focal plane shutter construction, in combination, a casing, spaced curtain rolls rotatably mounted in said casing, a curtain having its ends fastened respectively to said rolls, driving means associated with one of said rolls for drawing said curtain from the other of said rolls, additional driving means selectively connectable with said one roll for moving said curtain at a higher velocity, and remotely controllable means for connecting said additional driving means with said last-mentioned roll.

5. In focal plane shutter construction, in combination, a casing, spaced curtain rolls rotatably mounted in said casing, a curtain having its ends fastened respectively to said rolls, driving means associated with one of said rolls for drawing said curtain from the other of said rolls, a stationary shaft on which said one roll is mounted, and spring means associated with said shaft and said one roll and selectively connectable with said one roll for boosting the driving effect of said driving means to drive said curtain at a higher speed.

6. In focal plane shutter construction, in combination, a casing, spaced curtain rolls rotatably mounted in said casing, a curtain having its ends fastened respectively to said rolls, driving means associated with one of said rolls for drawing said curtain from the other of said rolls, and booster driving means selectively connectable with said one roll for exerting a driving force on said one roll supplemental to that of said first driving means to accelerate said curtain during the first portion of its movement to a velocity greater than that which the curtain attains under the sole impetus of said first driving means.

7. In focal plane shutter construction, in combination, a casing, spaced curtain rolls rotatably mounted in said casing, a curtain having its ends fastened respectively to said rolls, driving means associated with one of said rolls for drawing said curtain from the other of said rolls, booster driving means selectively connectable with said one roll for exerting a driving force on said one roll supplemental to that of said first driving means to accelerate said curtain during the first portion of its movement to a velocity greater than that which the curtain attains under the sole impetus of said first driving means, and means for maintaining said velocity at a substantially constant value during exposure movement of the curtain.

8. In focal plane shutter construction, in combination, a casing, spaced curtain rolls rotatably mounted in said casing, a curtain having its ends fastened respectively to said rolls, driving means associated with one of said rolls for drawing said curtain from the other of said rolls, said curtain having a slit adapted to be swept across the focal plane aperture, and booster driving means selectively connectable with said one roll for exerting a driving force on said one roll supplemental to that of said first driving means to accelerate said curtain during the period of travel of said slit from the other of said rolls to the edge of said aperture to a velocity greater than that which the curtain attains under the sole impetus of said first driving means.

9. In focal plane shutter construction, in combination, a casing, spaced curtain rolls rotatably mounted in said casing, a curtain having its ends fastened respectively to said rolls, driving means associated with one of said rolls for drawing said curtain from the other of said rolls, said curtain having a slit adapted to be swept across the focal plane aperture, booster driving means selectively connectable with said one roll for exerting a driving force on said one roll supplemental to that of said first driving means to accelerate said curtain during the period of travel of said slit from the other of said rolls to the edge of said aperture to a velocity greater than that which the curtain attains under the sole impetus of said first driving means, and means for maintaining said velocity of the curtain at a substantially constant value as said slot moves across said aperture.

IRVING W. DOYLE.
CARL V. JOHNSON.

REFERENCES CITED

The following references are of record in the file of this patent:

UNITED STATES PATENTS

| Number | Name | Date |
|---|---|---|
| 1,707,849 | Fairchild | Apr. 2, 1929 |
| 2,253,084 | Mihlyi | Aug. 19, 1941 |
| 2,126,302 | Young | Aug. 9, 1938 |
| 961,192 | Wollensak | June 14, 1910 |
| 1,201,764 | Richard | Oct. 17, 1916 |
| 650,787 | Wright et al. | May 29, 1900 |

FOREIGN PATENTS

| Number | Country | Date |
|---|---|---|
| 596,226 | Germany | Apr. 28, 1934 |